United States Patent
Martineau et al.

(10) Patent No.: US 10,929,606 B2
(45) Date of Patent: Feb. 23, 2021

(54) METHOD FOR FOLLOW-UP EXPRESSION FOR INTELLIGENT ASSISTANCE

(71) Applicant: Samsung Electronics Co., Ltd., Suwon-si (KR)

(72) Inventors: Justin C. Martineau, San Jose, CA (US); Avik Ray, Sunnyvale, CA (US); Hongxia Jin, Mountain View, CA (US)

(73) Assignee: Samsung Electronics Co., Ltd., Suwon-si (KR)

(*) Notice: Subject to any disclaimer, the term of this patent is extended or adjusted under 35 U.S.C. 154(b) by 261 days.

(21) Appl. No.: 15/904,196

(22) Filed: Feb. 23, 2018

(65) Prior Publication Data

US 2019/0205383 A1 Jul. 4, 2019

Related U.S. Application Data

(60) Provisional application No. 62/612,296, filed on Dec. 29, 2017.

(51) Int. Cl.
| | | |
|---|---|---|
| *G06F 40/30* | (2020.01) | |
| *G06N 7/00* | (2006.01) | |
| *G06F 40/169* | (2020.01) | |
| *G10L 15/197* | (2013.01) | |
| *G10L 15/22* | (2006.01) | |

(52) U.S. Cl.
CPC ........... *G06F 40/30* (2020.01); *G06F 40/169* (2020.01); *G06N 7/005* (2013.01); *G10L 15/197* (2013.01); *G10L 15/22* (2013.01)

(58) Field of Classification Search
CPC ........ G06F 40/00; G06F 40/166; G06F 40/20; G06F 40/279; G06F 40/289; G06F 40/30; G06F 40/40; G06F 40/56
See application file for complete search history.

(56) References Cited

U.S. PATENT DOCUMENTS

| | | | | |
|---|---|---|---|---|
| 5,027,406 A | * | 6/1991 | Roberts | G10L 15/063 704/244 |
| 5,909,666 A | * | 6/1999 | Gould | G09B 19/04 704/251 |
| 7,734,562 B1 | | 6/2010 | Hairman | |
| 8,688,698 B1 | | 4/2014 | Black et al. | |
| 8,849,668 B2 | | 9/2014 | Han et al. | |
| 9,449,599 B2 | | 9/2016 | Printz | |
| 2003/0216919 A1 | * | 11/2003 | Roushar | G06F 40/30 704/260 |

(Continued)

OTHER PUBLICATIONS

Vertanen, K., "Efficient computer interfaces using continuous gestures, language madels, and speech", Technical Report No. 627, pp. 1-46, Mar. 2005, University of Cambridge computer Laboratory, United Kingdom.

(Continued)

*Primary Examiner* — Michael N Opsasnick
(74) *Attorney, Agent, or Firm* — Sherman IP LLP; Kenneth L. Sherman; Steven Laut

(57) ABSTRACT

A method for intelligent assistance includes identifying one or more insertion points within an input comprising text for providing additional information. A follow-up expression that includes at least a portion of the input and the additional information at the one or more insertion points is generated for clarifying or supplementing meaning of the input.

20 Claims, 10 Drawing Sheets

(56) References Cited

U.S. PATENT DOCUMENTS

| | | | |
|---|---|---|---|
| 2004/0122656 A1* | 6/2004 | Abir | G06N 5/022 |
| | | | 704/4 |
| 2006/0036430 A1 | 2/2006 | Hu | |
| 2006/0274051 A1 | 12/2006 | Longe et al. | |
| 2007/0106499 A1* | 5/2007 | Dahlgren | G06F 16/243 |
| | | | 704/10 |
| 2009/0100154 A1 | 4/2009 | Stevenson et al. | |
| 2010/0131900 A1* | 5/2010 | Spetalnick | G06F 17/276 |
| | | | 715/825 |
| 2011/0202333 A1* | 8/2011 | Abir | G06F 16/3337 |
| | | | 704/4 |
| 2013/0021344 A1* | 1/2013 | Wang | G06K 9/00442 |
| | | | 345/426 |
| 2013/0158980 A1 | 6/2013 | Landry et al. | |
| 2014/0304600 A1 | 10/2014 | Chu | |
| 2014/0372122 A1* | 12/2014 | Harsham | G06F 3/16 |
| | | | 704/257 |
| 2015/0121285 A1* | 4/2015 | Eleftheriou | G06F 3/04842 |
| | | | 715/773 |
| 2015/0347007 A1 | 12/2015 | Chaudhri et al. | |
| 2016/0027437 A1 | 1/2016 | Hong et al. | |
| 2016/0275070 A1* | 9/2016 | Corston | G06F 3/0236 |
| 2017/0091312 A1 | 3/2017 | Ajmera et al. | |
| 2017/0125018 A1* | 5/2017 | Landry | G06F 17/27 |
| 2018/0101599 A1* | 4/2018 | Arnold | G06F 16/338 |
| 2018/0322958 A1* | 11/2018 | Kalafatis | G16H 50/70 |

OTHER PUBLICATIONS

International Search Report and Written Opinion dated Jun. 4, 2019 for International Application PCT/KR2019/002178 from Korean Intellectual Property Office, pp. 1-11, Republic of Korea.

Extended European Search Report dated Oct. 12, 2020 for European Application No. 19757416.3 from European Patent Office, pp. 1-7, Munich, Germany.

* cited by examiner

METHOD FOR FOLLOW-UP EXPRESSION FOR INTELLIGENT ASSISTANCE

CROSS-REFERENCE TO RELATED APPLICATIONS

This application claims the priority benefit of U.S. Provisional Patent Application Ser. No. 62/612,296, filed Dec. 29, 2017.

COPYRIGHT DISCLAIMER

A portion of the disclosure of this patent document may contain material that is subject to copyright protection. The copyright owner has no objection to the facsimile reproduction by anyone of the patent document or the patent disclosure as it appears in the patent and trademark office patent file or records, but otherwise reserves all copyright rights whatsoever.

TECHNICAL FIELD

One or more embodiments generally relate to virtual assistants and, in particular, to generating a follow-up expression for intelligent assistance.

BACKGROUND

Customers use voiced based personal assistants such as AMAZON® ALEXA®, GOOGLE ASSISTANT®, SIRI®, MICROSOFT CORTANA®, and SAMSUNG BIXBY® to answer questions, solve problems, perform tasks that save time, energy, and make their lives more convenient. User interactions with these personal assistants often require a bit of back-and-forth communication as most users will not specify every relevant detail in a single statement.

SUMMARY

One or more embodiments generally relate to identifying insertion points of an expression to provide additional information for generating a follow-up expression for intelligent assistance. In one embodiment, a method for intelligent assistance includes identifying one or more insertion points within an input comprising text for providing additional information. A follow-up expression that includes at least a portion of the input and the additional information at the one or more insertion points is generated for clarifying or supplementing meaning of the input.

In another embodiment, an electronic device includes a memory storing instructions. At least one processor executes the instructions including a process configured to identify one or more insertion points within an input comprising text for providing additional information, and generate a follow-up expression including at least a portion of the input and the additional information at the one or more insertion points for clarifying or supplementing meaning of the input.

In one embodiment a non-transitory processor-readable medium that includes a program that when executed by a processor perform a method that includes identifying one or more insertion points within an input comprising text is identified for providing additional information. A follow-up expression including at least a portion of the input and the additional information at the one or more insertion points is generated for clarifying or supplementing meaning of the input.

These and other aspects and advantages of one or more embodiments will become apparent from the following detailed description, which, when taken in conjunction with the drawings, illustrate by way of example the principles of the one or more embodiments.

BRIEF DESCRIPTION OF THE DRAWINGS

For a fuller understanding of the nature and advantages of the embodiments, as well as a preferred mode of use, reference should be made to the following detailed description read in conjunction with the accompanying drawings, in which.

DETAILED DESCRIPTION

Figure 1:
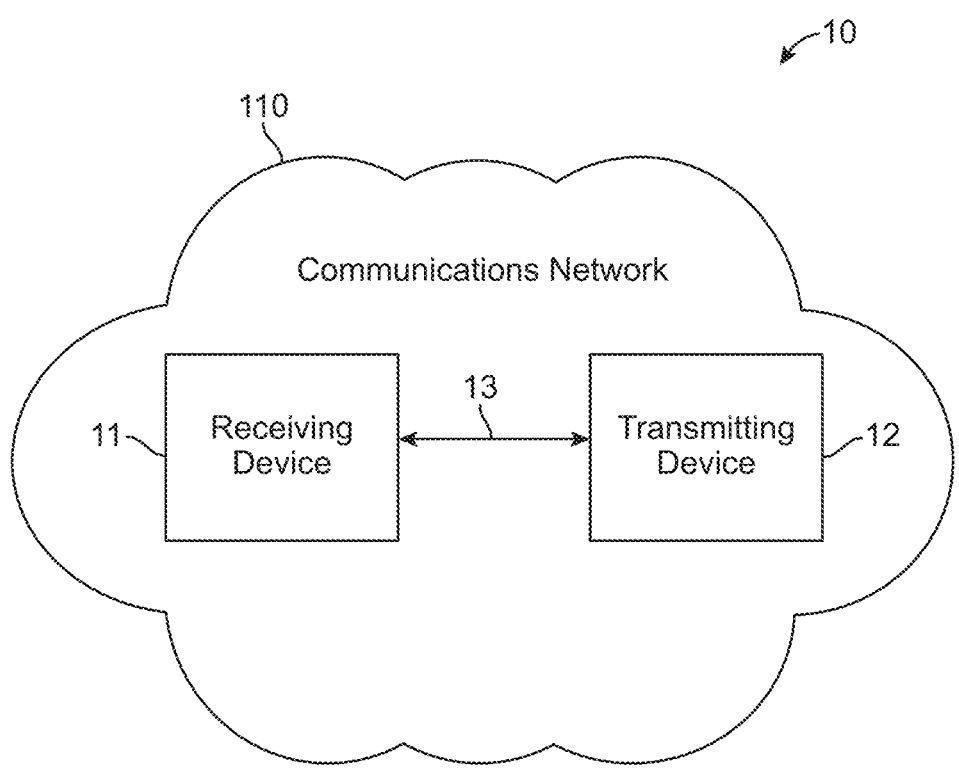
FIG. 1 shows a schematic view of a communications system, according to some embodiments.

The following description is made for the purpose of illustrating the general principles of one or more embodiments and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

It should be noted that the terms "at least one of" refers to one or more than one of the elements that follow. For example, "at least one of a, b, c, or a combination thereof" may be interpreted as "a," "b," or "c" individually; or as "a" and "b" together in combination, as "b" and "c" together in combination; as "a" and "c" together in combination; or as "a," "b" and "c" together in combination.

One or more embodiments provide for identifying insertion points of an expression to provide additional information for generating a follow-up expression for intelligent assistance. Some embodiments include a method for intelligent assistance that includes Identifying one or more insertion points within an input comprising text for providing additional information. A follow-up expression that includes at least a portion of the input and the additional information at the one or more insertion points is generated for clarifying or supplementing meaning of the input.

Conventional personal assistants require advanced natural language understanding and dialogue management technologies to interact with, understand and carry out the user's intent. These conventional personal assistants do not generalize well to large sets of intents or to a wide variety of domains of interest. The conventional approach to build a personal assistant is to build a core engine that augments the input language with meta-data for downstream processing by a set of intent specific service providers. This is called a skills application programming interface (API) based approach. In a skills API based approach, a core natural language understanding (NLU) engine augments the input language with meta-data for downstream processing by a set of intent specific service providers. Each of these service providers must implement downstream processing to deal with the details of the intent and decide what questions to ask or actions to perform. Intent service providers tend to take a "Slot Filling" approach. In a slot filling approach each intent service provider creates a predefined set of attributes ("slots") that should be provided by the user for each intent. For each attribute the service providers write a question template designed to ask the user about that attribute, where the values for existing attributes can be referenced in the question template. A dialogue manager with a finite state machine or a list processing system, or other similar technology is used to select and ask one of these questions until the values for all the attributes are provided. For example, a pizza delivery service would most likely define attributes for the place to deliver to, the size of the pizza, and the toppings on the pizza.

For ease of understanding the conventional approach, suppose an example input is "Buy a sausage pizza." The intent classifier will pick the pizza delivery intent, and tag the sausage with a tag for pizza topping. Then the dialogue manager will record that value for the pizza topping slot, check its list of unfilled slots, and select the next slot to fill. It may select the 'size' slot next, and if it does it will then decide to ask the associated question for that slot "What size pizza do you want?" This process will proceed through the rest of the slots until it is ready to place your order.

There are three problems with this conventional dialogue management approach. First, it can only ask the pre-defined follow-up questions for the pre-defined attributes. If there is not a template, there is no script to follow, and thus no follow-up questions. If the template was made without the slot, there will never be any follow-up questions about that slot. This conventional dialogue management approach does not work in the general case or for anything unexpected. Take for example, "Deliver a sausage pizza and a Coke." The slot filling approach will not: discover a slot for side orders and put the Coke in it, or ask you if you want a side of breadsticks with that order. The slot filling approach may get confused and: send your sentence to the wrong intent service provider, or put Coke on your pizza. The slot filling approach might just not request any coke with your pizza. All because the computer programmer that wrote the pizza delivery service forgot about, or never knew about that case. This problem will be more noticeable for services that the average programmer does not use or is not familiar with.

Second, the conventional dialogue management approach lacks the capability to rank the slot values and suggest the most appropriate choices in a follow-up question. Third, it takes a lot of labor to define all the attributes for each intent/service and write out all the input examples required to train the system to recognize the intent of the user and tag the slot values with the slot types. This is a significant problem because adding new intents in the same domain, or new slot types in the intent, or even changing just a few examples in an intent, is not a safe operation as it can change the way the system identifies which intent to select and what slot types to tag. Everything must be tested again before operation. This is a major failing because there are a potentially limitless number of intents and each intent can be handled at different levels of detail. Intents are generally easier to recognize when the number of examples is large and when these examples cover every relevant slot in every valid permutation. The number of examples required increases with the number of skills, slot types, and slot values, in the system and with the structural linguistic similarity and shared vocabulary of the intents.

With conventional personal assistants, for any valuable service there are often multiple providers and only one can be selected. When the third party service providers are left to implement the intents themselves this reduces the development costs of the personal assistant, but competing service providers with more examples utterances, and with examples of more of the relevant attributes will tend to beat competitors who do not take such steps. When there are multiple competing personal assistants, the same factors are still in play but at a higher level.

In some embodiments, the system can not only ask a follow-up question about unspecified slots, but it can discover slots that were not originally used in the examples for that intent, discover slot values for the new slot, and even work those slot values into the original input or ask a question about the slot using its discovered slot values as possible suggested choices. In one example embodiment, the system may respond to "Deliver a sausage pizza and a coke" with "Did you want me to deliver a sausage pizza with breadsticks and a Coke?" because it determined that additional information (e.g., breadsticks) is normally located between the pizza and the coke.

One or more embodiments provide a personal assistant with a stronger core engine and more useful skills that provide more value to a customer. According to some embodiments, the personal assistant may select the correct skill/intent to provide for a greater number of skills. Some embodiments alleviate tedious burdens placed on skill developers and increase their throughput and attract more developers leading to a more capable personal assistant. In one or more embodiments, a core engine of the personal assistant is more capable, flexible, and general purpose than conventional personal assistants. Some embodiments alleviate the most tedious burdens in skill development, and improve the ability of the core NLU engine to select the correct skill.

Some embodiments determine where additional relevant details can be inserted into a natural language expression without changing the intent of the expression and with minimal changes to the meaning of the expression. Alternative versions of a natural language expression may be generated with words or phrases that add to the meaning of the original expression. This includes adding relevant details, specifying (unstated) options, and adding constraints. The original expression and the alternative expression both evoke the same type of intent, but have different meanings.

One or more embodiments generate follow-up questions designed to clarify the meaning of an expression by asking for additional information such as relevant details, specifying unexpressed options or constraints. Alternative versions of natural language expression are generated, especially the types described above, for training systems that tag slots in an expression or determine the intent of an expression. Some embodiments generate additional details and inserts them into a sentence without disturbing the readability, flow, and general intent of the expression. Conventional systems may generate freely flowing text from an insertion point that often runs tangential to the rest of the expression, and do not generate text that links back to the rest of the expression; they generate the next most probable text. This causes several problems. It can generate for insertion the actual next words in the expression causing a disfluent repetition that does not add information. Furthermore, if the next part of the expression is not about the most likely topic, then the text will not sensibly link back to the rest of the expression.

Some embodiments identify insertion points and determines the amount to insert and generates a specified number of words at specific spots in an expression. Both of these techniques are features with unique capabilities that support other parts of a Natural Language Interface to Personal Assistants. One or more embodiments generate clarifying follow-up questions for Natural Language Interfaces to Personal Assistants that rely upon the system to Identify Insertion points and determine the amount to insert because it needs to identify where additional details are commonly located (missing) and determine how much additional detail to add. Some embodiments may be used to identify when a follow-up question would be appropriate, and generate a specified number of words at specific spots in an expression can then provide the new details of the follow-up question.

FIG. 1 is a schematic view of a communications system 10, in accordance with one embodiment. Communications system 10 may include a communications device that initiates an outgoing communications operation (transmitting device 12) and a communications network 110, which transmitting device 12 may use to initiate and conduct communications operations with other communications devices within communications network 110. For example, communications system 10 may include a communication device that receives the communications operation from the transmitting device 12 (receiving device 11). Although communications system 10 may include multiple transmitting devices 12 and receiving devices 11, only one of each is shown in FIG. 1 to simplify the drawing.

Any suitable circuitry, device, system or combination of these (e.g., a wireless communications infrastructure including communications towers and telecommunications servers) operative to create a communications network may be used to create communications network 110. Communications network 110 may be capable of providing communications using any suitable communications protocol. In some embodiments, communications network 110 may support, for example, traditional telephone lines, cable television, Wi-Fi (e.g., an IEEE 802.11 protocol), BLUETOOTH®, high frequency systems (e.g., 900 MHz, 2.4 GHz, and 5.6 GHz communication systems), infrared, other relatively localized wireless communication protocol, or any combination thereof. In some embodiments, the communications network 110 may support protocols used by wireless and cellular phones and personal email devices (e.g., a BLACKBERRY®). Such protocols may include, for example, GSM, GSM plus EDGE, CDMA, quadband, and other cellular protocols. In another example, a long-range communications protocol can include Wi-Fi and protocols for placing or receiving calls using VOIP, LAN, WAN, or other TCP-IP based communication protocols. The transmitting device 12 and receiving device 11, when located within communications network 110, may communicate over a bidirectional communication path such as path 13, or over two unidirectional communication paths. Both the transmitting device 12 and receiving device 11 may be capable of initiating a communications operation and receiving an initiated communications operation.

The transmitting device 12 and receiving device 11 may include any suitable device for sending and receiving communications operations. For example, the transmitting device 12 and receiving device 11 may include, but are not limited to mobile telephone devices, television systems, cameras, camcorders, a device with audio video capabilities, tablets, wearable devices, smart appliances, smart picture frames, and any other device capable of communicating wirelessly (with or without the aid of a wireless-enabling accessory system) or via wired pathways (e.g., using traditional telephone wires). The communications operations may include any suitable form of communications, including for example, data and control information, voice communications (e.g., telephone calls), data communications (e.g., e-mails, text messages, media messages), video communication, or combinations of these (e.g., video conferences).

Figure 2:
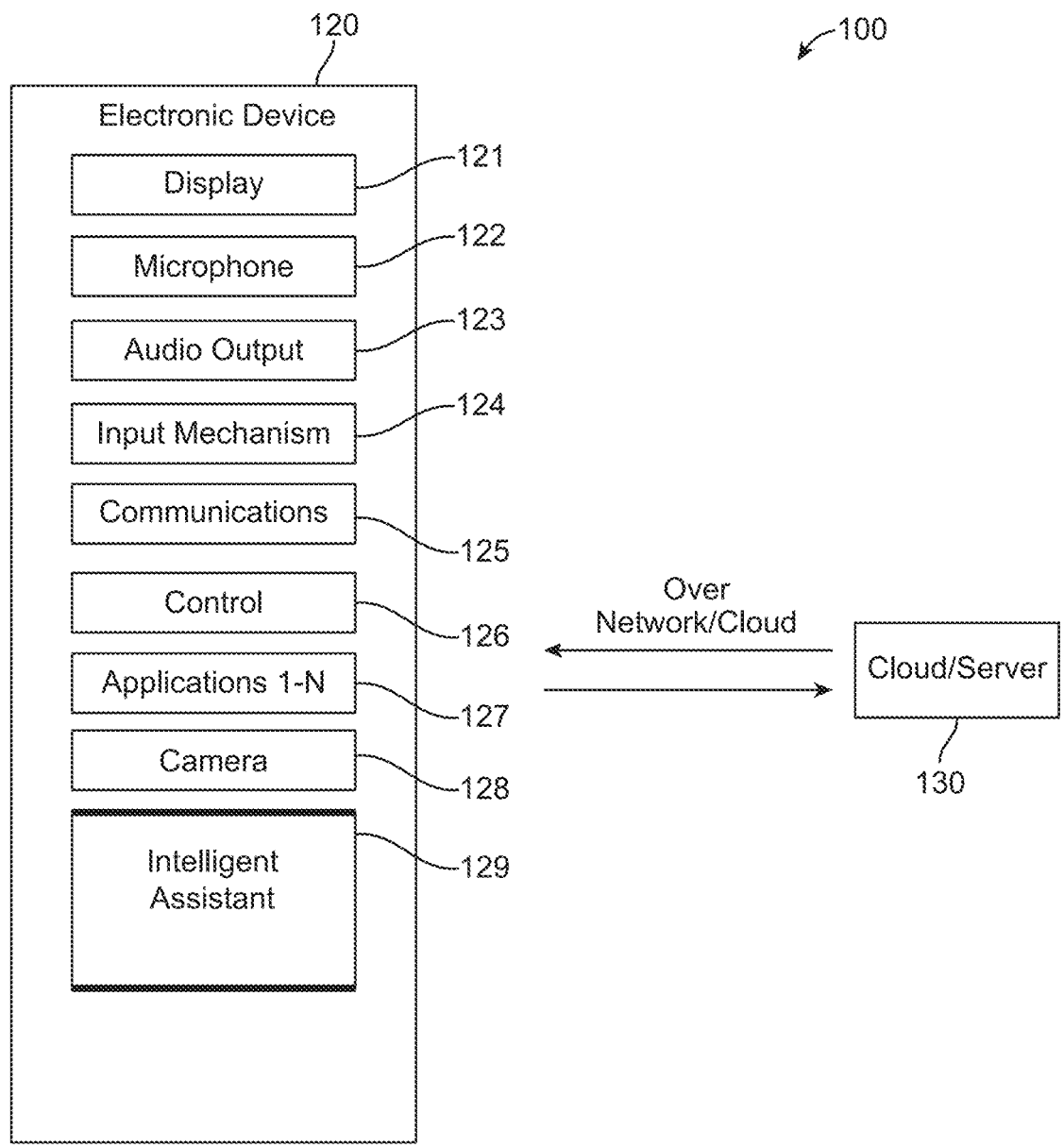
FIG. 2 shows a block diagram of architecture for a system including an electronic device including an intelligent assistant app, according to some embodiments.

FIG. 2 shows a functional block diagram of an architecture system 100 that may be used for personal assistants to ask relevant follow-up questions and to drastically reduce development time and costs for personal assistants such as BIXBY® while simultaneously increasing the breadth and accuracy of natural language intent understanding capabilities using an electronic device 120 (e.g., mobile telephone devices, television (TV) systems, cameras, camcorders, a device with audio video capabilities, tablets, pad devices, wearable devices, smart appliances, smart picture frames, smart lighting, etc.). Both the transmitting device 12 (FIG. 1) and receiving device 11 may include some or all of the features of the electronics device 120. In one embodiment, the electronic device 120 may comprise a display 121, a microphone 122, an audio output 123, an input mechanism 124, communications circuitry 125, control circuitry 126, a camera 128, an intelligent assistant app 129 (for generating functionally similar but semantically different paraphrases with additional details, identifying insertion points and determining the amount to insert, generating a specified number of words at specific spots in an expression, asking clarifying follow-up questions, and communicating with the communications circuitry 125 to obtain/provide information thereof with the cloud or server 130; and may include any of the processing for, but not limited to, the examples as described below), and any other suitable components. In one embodiment, applications 1-N 127 are provided and may be obtained from a cloud or server 130, a communications network 110, etc., where N is a positive integer equal to or greater than 1.

In one embodiment, all of the applications employed by the audio output 123, the display 121, input mechanism 124, communications circuitry 125, and the microphone 122 may be interconnected and managed by control circuitry 126. In one example, a handheld music player capable of transmitting music to other tuning devices may be incorporated into the electronics device 120.

In one embodiment, the audio output 123 may include any suitable audio component for providing audio to the user of electronics device 120. For example, audio output 123 may include one or more speakers (e.g., mono or stereo speakers) built into the electronics device 120. In some embodiments, the audio output 123 may include an audio component that is remotely coupled to the electronics device 120. For example, the audio output 123 may include a headset, headphones, or earbuds that may be coupled to communications device with a wire (e.g., coupled to electronics device 120 with a jack) or wirelessly (e.g., BLUETOOTH® headphones or a BLUETOOTH headset).

In one embodiment, the display 121 may include any suitable screen or projection system for providing a display visible to the user. For example, display 121 may include a screen (e.g., an LCD screen, LED screen, OLED screen, etc.) that is incorporated in the electronics device 120. As another example, display 121 may include a movable display or a projecting system for providing a display of content on a surface remote from electronics device 120 (e.g., a video projector). Display 121 may be operative to display content (e.g., information regarding communications operations or information regarding available media selections) under the direction of control circuitry 126.

In one embodiment, input mechanism 124 may be any suitable mechanism or user interface for providing user inputs or instructions to electronics device 120. Input mechanism 124 may take a variety of forms, such as a button, keypad, dial, a click wheel, mouse, visual pointer, remote control, one or more sensors (e.g., a camera or visual sensor, a light sensor, a proximity sensor, etc., or a touch screen. The input mechanism 124 may include a multi-touch screen.

In one embodiment, communications circuitry 125 may be any suitable communications circuitry operative to connect to a communications network (e.g., communications network 110, FIG. 1) and to transmit communications operations and media from the electronics device 120 to other devices within the communications network. Communications circuitry 125 may be operative to interface with the communications network using any suitable communications protocol such as, for example, Wi-Fi (e.g., an IEEE 802.11 protocol), Bluetooth®, high frequency systems (e.g., 900 MHz, 2.4 GHz, and 5.6 GHz communication systems), infrared, GSM, GSM plus EDGE, CDMA, quadband, and other cellular protocols, VOIP, TCP-IP, or any other suitable protocol.

In some embodiments, communications circuitry 125 may be operative to create a communications network using any suitable communications protocol. For example, communications circuitry 125 may create a short-range communications network using a short-range communications protocol to connect to other communications devices. For example, communications circuitry 125 may be operative to create a local communications network using the BLUETOOTH® protocol to couple the electronics device 120 with a BLUETOOTH® headset.

In one embodiment, control circuitry 126 may be operative to control the operations and performance of the electronics device 120. Control circuitry 126 may include, for example, a processor, a bus (e.g., for sending instructions to the other components of the electronics device 120), memory, storage, or any other suitable component for controlling the operations of the electronics device 120. In some embodiments, a processor may drive the display and process inputs received from the user interface. The memory and storage may include, for example, cache, Flash memory, ROM, and/or RAM/DRAM. In some embodiments, memory may be specifically dedicated to storing firmware (e.g., for device applications such as an operating system, user interface functions, and processor functions). In some embodiments, memory may be operative to store information related to other devices with which the electronics device 120 performs communications operations (e.g., saving contact information related to communications operations or storing information related to different media types and media items selected by the user).

In one embodiment, the control circuitry 126 may be operative to perform the operations of one or more applications implemented on the electronics device 120. Any suitable number or type of applications may be implemented. Although the following discussion will enumerate different applications, it will be understood that some or all of the applications may be combined into one or more applications. For example, the electronics device 120 may include applications 1-N 127 including, but not limited to: an automatic speech recognition (ASR) application, OCR application, a dialog application, a map application, a media application (e.g., QuickTime, MobileMusic.app, or MobileVideo.app), social networking applications (e.g., FACEBOOK®, INSTAGRAM®, TWITTER®, etc.), a calendaring application (e.g., a calendar for managing events, appointments, etc.), an Internet browsing application, etc. In some embodiments, the electronics device 120 may include one or multiple applications operative to perform communications operations. For example, the electronics device 120 may include a messaging application, an e-mail application, a voicemail application, an instant messaging application (e.g., for chatting), a videoconferencing application, a fax application, or any other suitable application for performing any suitable communications operation.

In some embodiments, the electronics device 120 may include a microphone 122. For example, electronics device 120 may include microphone 122 to allow the user to transmit audio (e.g., voice audio) for speech control and navigation of applications 1-N 127, during a communications operation or as a means of establishing a communications operation or as an alternative to using a physical user interface. The microphone 122 may be incorporated in the electronics device 120, or may be remotely coupled to the electronics device 120. For example, the microphone 122 may be incorporated in wired headphones, the microphone 122 may be incorporated in a wireless headset, the microphone 122 may be incorporated in a remote control device, etc.

In one embodiment, the camera module 128 comprises one or more camera devices that include functionality for capturing still and video images, editing functionality, communication interoperability for sending, sharing, etc. photos/videos, etc.

In one embodiment, the electronics device 120 may include any other component suitable for performing a communications operation. For example, the electronics device 120 may include a power supply, ports, or interfaces for coupling to a host device, a secondary input mechanism (e.g., an ON/OFF switch), or any other suitable component.

Figure 3:
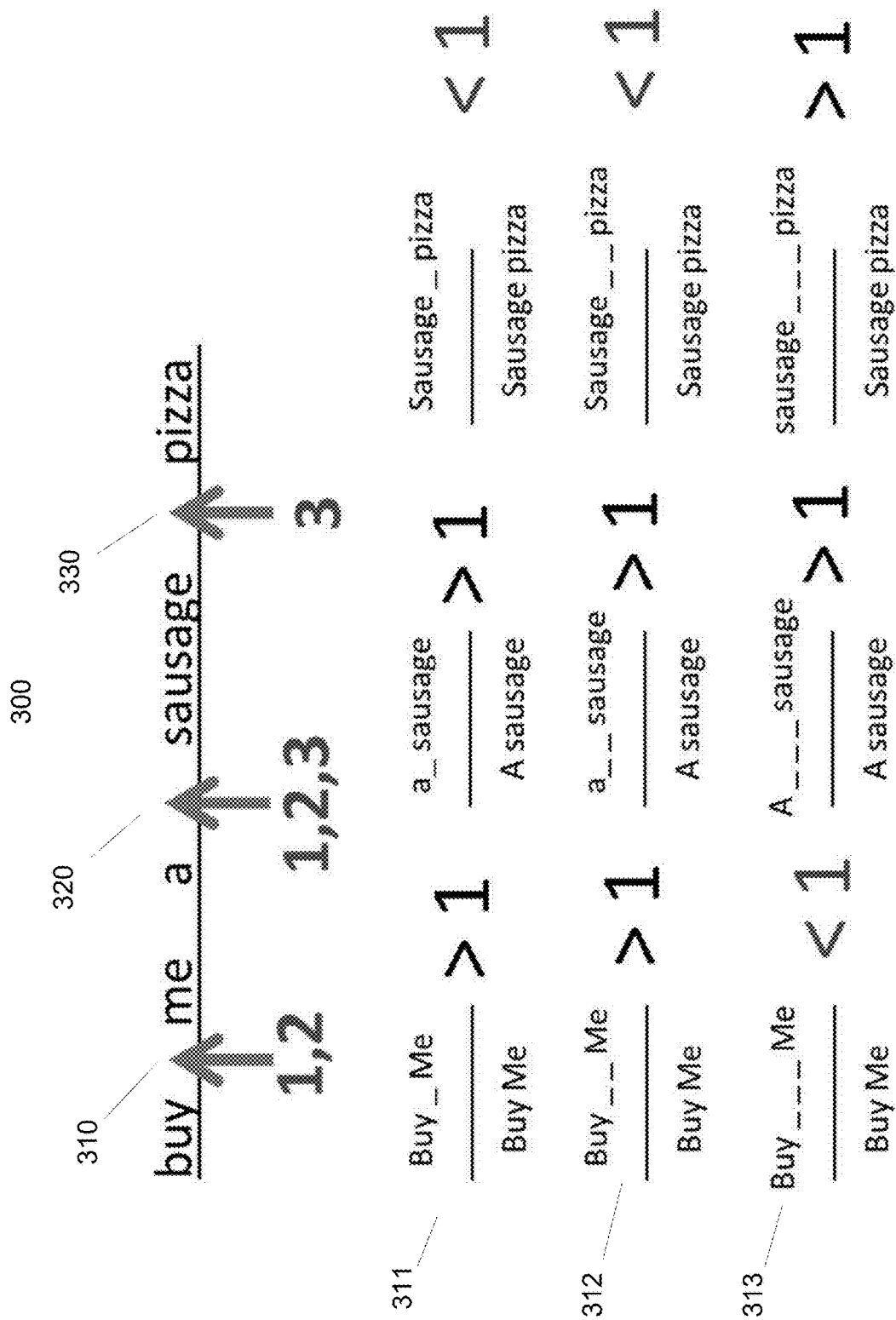
FIG. 3 shows an example of identifying insertion points and volume, according to some embodiments.

FIG. 3 shows an example 300 of identifying insertion points and volume (amount to insert), according to some embodiments. In example 300, the expression "buy me a sausage pizza" is used and includes insertion points 310, 320 and 330. In some embodiments, an utterance is spoken, captured by a microphone (e.g., microphone 122, FIG. 1) and converted to text (e.g., using voice-to-text recognition processing by electronic device 120, cloud/server 130, or a combination thereof). In other embodiments, the input is a textual expression. In some embodiments, for each sequential pair of words in the expression a base score is determined by processing through the cloud or server 130, the intelligent assistant 129 using a processor and memory of electronic device 120, or a combination thereof. The base score measures how likely the two words of the sequential pair are to occur in that order in normal usage. In some embodiments, the processing measures how likely the two words are to occur in that order, but at various short distances from each other in normal usage. The processing further scores the insertion quality, which is based on the scores at distance D divided by the base score. If the ratio is greater than a threshold (e.g., a number selected by an artificial intelligence (AI) programmer, selected based on the processing speed, etc.), the processing identifies the position between the two words as an insertion point, and sets the amount to insert to the distance D.

In the example 300, for the distance D of 1 (reference 311), the pair of "buy" and "me" results in buy_me/buy me>1. The pair "a" and "sausage" results in a_sausage/a sausage>1. The pair "sausage" and "pizza" results in sausage_pizza/sausage pizza<1. For the distance D of 2 (reference 312), the pair of "buy" and "me" results in buy_ —me/buy me>1. The pair "a" and "sausage" results in a_ —sausage/a sausage>1. The pair "sausage" and "pizza" results in sausage_ —pizza/sausage pizza<1. For the distance D of 3 (reference 313), the pair of "buy" and "me" results in buy_ — —me/buy me<1. The pair "a" and "sausage" results in a_ — —sausage/a sausage>1. The pair "sausage" and "pizza" results in sausage_ — —pizza/sausage pizza>1. Therefore, the insertion point 310 may have 1 or 2 words inserted; the insertion point 320 may have 1, 2 or 3 words inserted; and the insertion point 330 may have 3 words inserted. Further details for identifying insertion points and volume are described below with reference to FIG. 7.

Figure 4:
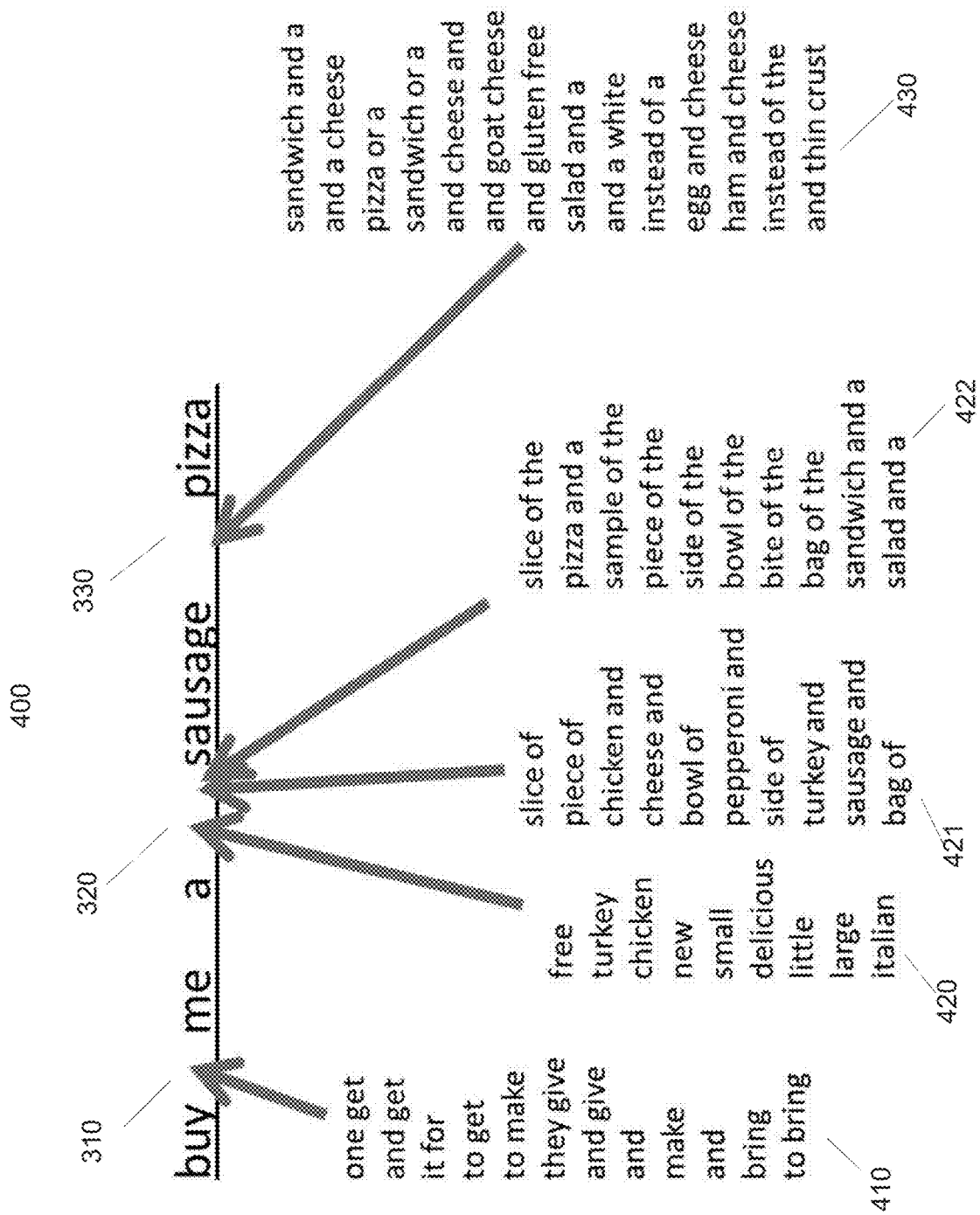
FIG. 4 shows an example of generating words to the specification, according to some embodiments.

FIG. 4 shows an example 400 of generating words to the specification, according to some embodiments. Following the example 300 (FIG. 3), in example 400, a preprocessing portion includes training a generative language model to predict the forward probabilities, and training the generative language model to predict the backwards probabilities. The expression (e.g., "buy me a sausage pizza") is represented as a graph including nodes. The processing then creates nodes for insertion points where words must be generated. The nodes are inserted into the graph using forwards and backwards models to generate edge weights. The processing ensures that the paths connect from the start to the end, and proceeds to go through the specified number of inserted nodes at the insertion points. The paths are scored with forwards and backwards scores from the models, selects the top X best scoring paths, and returns the associated words. In some embodiments, the generative language models may be personalized. Simple personalized language model embodiments may include: training on personal natural language data created by the user such as their emails and other recorded conversations; updating an existing language model with additional training iterations on personal language data; using an ensemble of personal and general models; blending the model parameters of personal and general models; using model fusion with personal and general models, etc.

In example 400, for the insertion point 310, the associated words 410 may include the following example words (i.e., 1 or 2 words): "one get," "and get," "it for," "to get," "to make," "they give," "and give," "and," "make," "and," "bring," and "to bring." For the insertion point 320, the associated words 420 may include the example words (i.e., 1 word): "free," "turkey," "chicken," "new," "small," "delicious," "little," "large" and "Italian"; the associated words 421 may include the words (i.e., 2 words): "slice of," "piece of," "chicken and," "cheese and," "bowl of," "pepperoni and," "side of," "turkey and," "sausage and", and "bag of"; the associated words 422 may include the example words (i.e., 3 words): "slice of the," "pizza and a," "sample of the," "piece of the," "side of the," "bowl of the," "bite of the," "bag of the," "sandwich and a," and "salad and a." For the insertion point 330, the associated words 430 may include the example words (i.e., 3 words): "sandwich and a," "and a cheese," "pizza or a," "sandwich or a," "and cheese and," "and goat cheese," "and gluten free," "salad and a," "and a white," "instead of a," "egg and cheese," "ham and cheese," "instead of the," and "and thin crust." Further details for generating words to the specification are described below with reference to FIG. 8.

Figure 5:
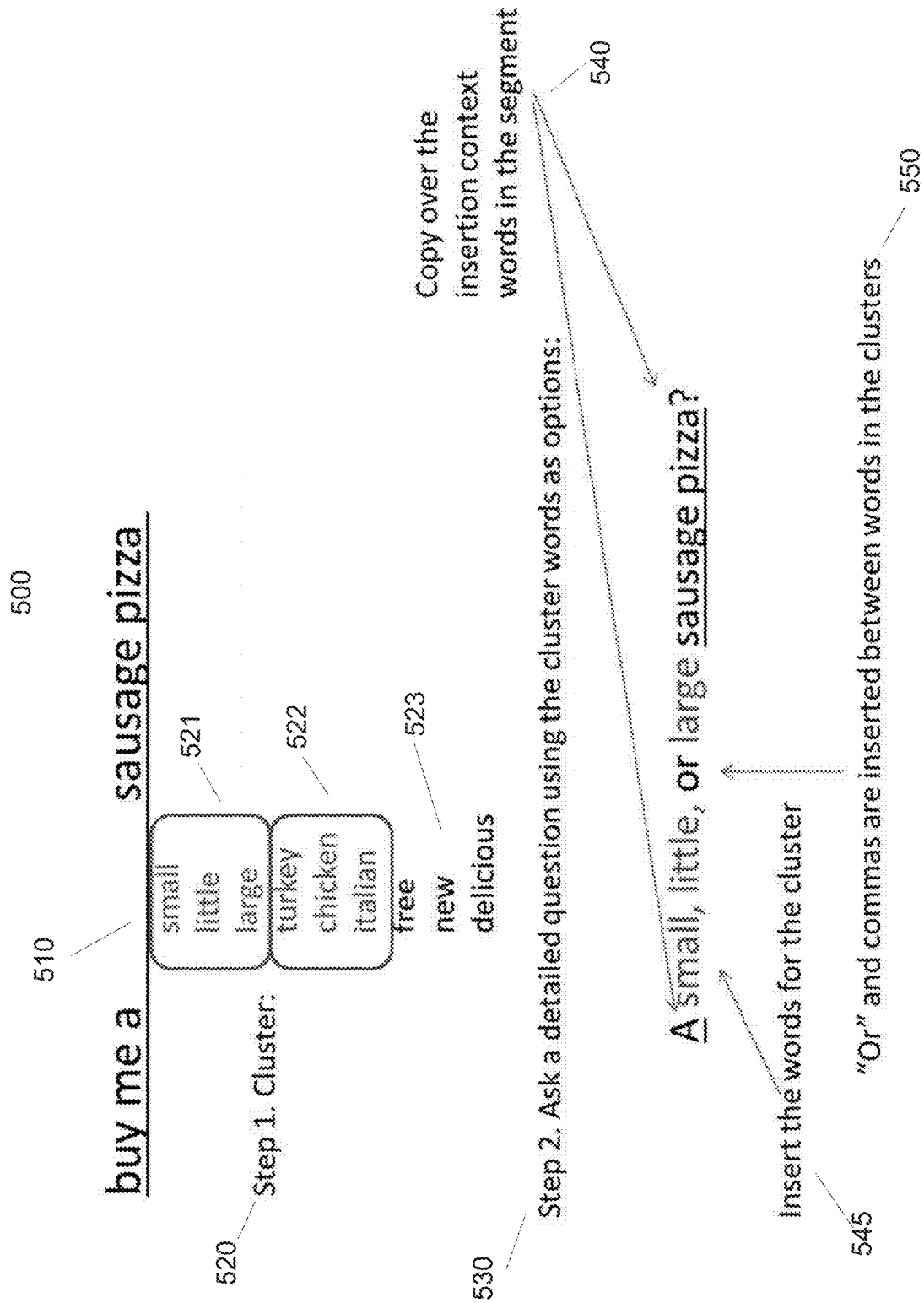
FIG. 5 shows an example of asking follow up questions using details, according to some embodiments.

FIG. 5 shows an example 500 of generating follow up questions using details, according to some embodiments. In some embodiments, the processing for example 500 includes identifying the insertion points, generation of the specified number of words at the specific spots in an expression (the generated words are the details that need to be clarified), and generating a clarifying question with the details. In one or more embodiments, generation of the clarifying question may include partitioning generated details to present a choice between similar alternatives (e.g., separate options with the term "or"); general template, e.g., "did you mean X, Y or Z?); and general template plus details in context: keep the words around the insertion point 510 next to the generated details (e.g., can ask for confirmation of one detail or present a choice using "or"). A result of partitioning step 520, example partition of words 521 may include: small, little and large; partition of words 522 may include turkey, chicken and Italian, and other words 523 may include: free, new and delicious. The partitioning of the words 521 maintains order of the words 521, where the partitions (522 and 523) are considered subsets if the words 521.

In some embodiments, for the next step 530 a detailed question is asked using the partition words as options. The insertion context words in the segment 540 are copied over, and the words for the partition are inserted at 545. In this example, the words from cluster 521 (small, little and large) are inserted after "A." The word "or" and commas are inserted between words in the partition(s) at 550. The result is "A small, little or large sausage pizza." Further details for generating follow up questions using details are described below with reference to FIG. 9.

Figure 6:
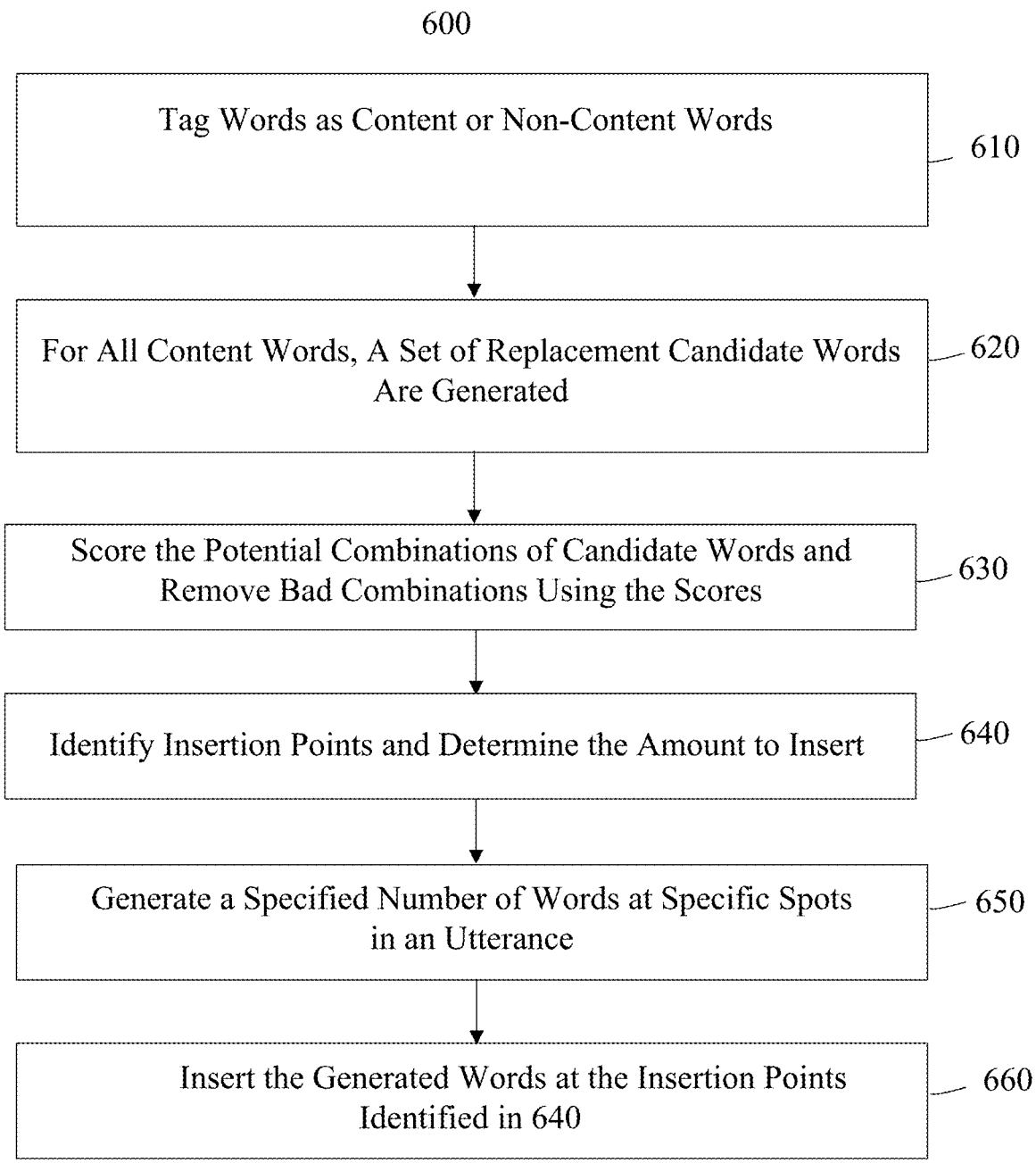
FIG. 6 shows a block diagram of a process for generating functionally similar but semantically different paraphrases with additional details, according to some embodiments.

FIG. 6 shows a block diagram of a process 600 for generating functionally similar but semantically different paraphrases with additional details, according to some embodiments. In block 610, words are tagged as either content, or non-content words. In some embodiments, non-content words may be identified by running a part-of-speech tagger process. Closed class words are normally non-content words and may be identified by their part-of-speech tags (prepositions, determiners, etc.). All other words are considered as content words. In block 620, for all content words, a set of candidate replacement words are generated using processing to measure functional similarity between two words in the same context. In block 630, the potential combinations of candidate words are scored, and the bad combinations are removed using the scores. In some embodiments, the functional similarity scores for each selected candidate are multiplied. A threshold is used to determine if the combination scores have a value that is large enough to be acceptable. The threshold may be set to a pre-specified level of functional similarity. Alternatively, in some embodiments the threshold is set using a set of rules to select a value given the functional similarity scores for each candidate. An example rule may be to set the threshold to the functional similarity score with the worst suggested functionally similar word from a set of the best suggested replacements for all of the open class words. Process 600 then generates additional details for the combinations and inserts them into the combinations as additional paraphrases based on blocks 640, 650 and 660.

In some embodiments, additional details for each combination were generated in block 630. In one embodiment, additional details are generated on the original expression and are reused by inserting them into the same insertion points in the combinations generated in block 630. In block 640 the insertion points are identified and the amount to insert are determined. In block 650 a specified number of words are generated at specific spots in an expression. In block 660 the generated words are inserted at the insertion points identified in block 640.

Figure 7:
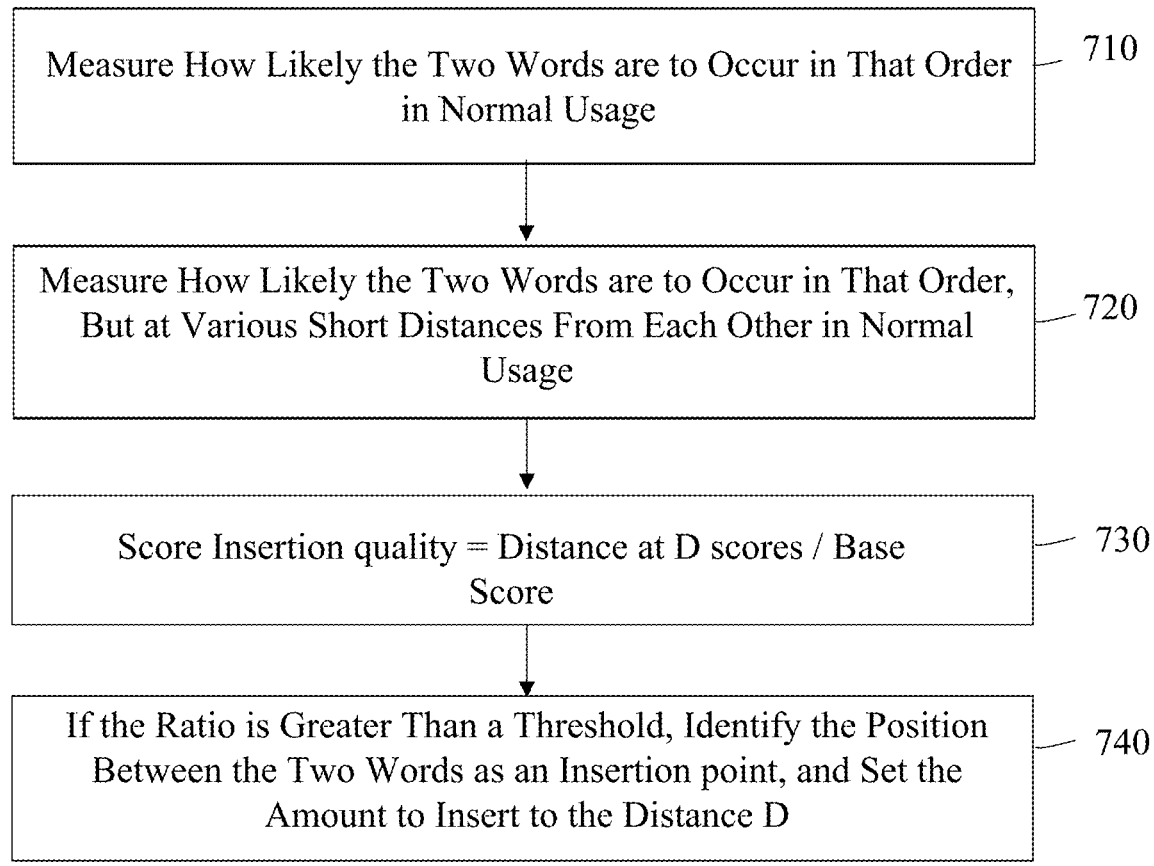
FIG. 7 shows a block diagram of a process for identifying insertion points and determine the amount to insert, according to some embodiments.

FIG. 7 shows a block diagram of a process 700 for identifying insertion points and determining the amount to insert, according to some embodiments. In some embodiments, for each sequential pair of words in an expression (e.g., where the expression is spoken, captured by a microphone (e.g., microphone 122, FIG. 1) and converted to text (e.g., using voice-to-text recognition processing by electronic device 120, cloud/server 130, or a combination thereof)): in block 710 process 700 measure how likely the two words are to occur in that order in normal usage. This is the base score. In some embodiments normal usage is measured with the probabilities stored in a statistical language model. In one or more embodiments process 700 uses raw corpus n-gram counts. In block 720 process 700 measures how likely the two words are to occur in that order, but at various short distances from each other in normal usage. In some embodiments, process 700 measures when there are 1, 2, or 3 words between the pair of words. These scores are the distance at D scores, where D is the number of words between the pair of words. In block 730 process 700 scores insertion quality=Distance at D scores/Base Score. In block 740, if the ratio is greater than a threshold, the position between the two words is identified as an insertion point, and the amount to insert is set to the distance D.

Figure 8:
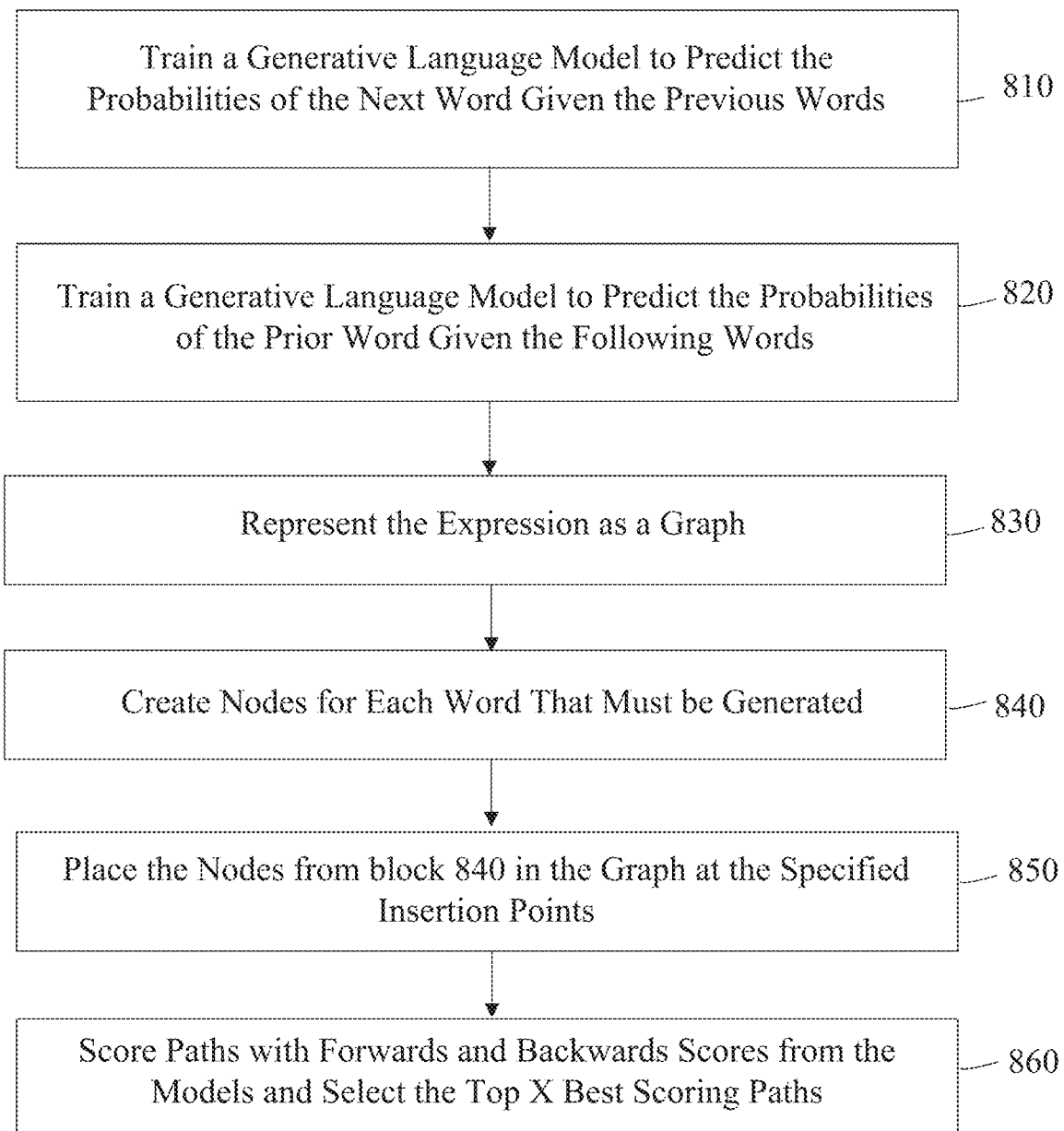
FIG. 8 shows a block diagram of a process for generating a specified number of words at specific spots in an expression, according to some embodiments.

FIG. 8 shows a block diagram of a process 800 for generating a specified number of words at specific spots in an expression, according to some embodiments. Given an expression (e.g., where the expression is spoken, captured by a microphone (e.g., microphone 122, FIG. 1) and converted to text (e.g., using voice-to-text recognition processing by electronic device 120, cloud/server 130, or a combination thereof)), and the requirements to generate a specific number of words at specific locations, process 800 produces a set of words that can be inserted into the corresponding locations. In some embodiments, the expression may be a textual expression. Here, "X" is used to denote the number of unique sets of words that are desired to generate. In block 810 process 800 trains a generative language model to predict the probabilities of the next word given the previous words. Processing in block 810 is referred to as the forwards model. In some embodiments, the forwards model is an n-gram language model. In one or more embodiments, the forwards model is a Recurrent Neural Network (RNN) with Long-Short Term Memory blocks. In block 820 process 800 trains a generative language model to predict the probabilities of the prior word given the following words. Processing in block 819 is referred to as the backwards model. In some embodiments the backwards model is an n-gram language model. In one or more embodiments the backwards model is an RNN with Long-Short Term Memory blocks. In block 830 process 800 represents the expression as a graph. In some embodiments start and stop nodes are added in front of and behind the expression and each word is linked to its successor with an edge. In block 840 process 800 creates nodes for each word that must be generated. In block 850 process 800 places the nodes from block 840 in the graph at the specified insertion points. In some embodiments the forwards and backwards models are used to generate and score edge weights linking these additional nodes to the graph. The nodes should be inserted so there are paths from the start to the end, where each path passes through a number of nodes equal to the specified number of words at that insertion point. A word is associated with each edge. In some embodiments the probability of generating that word with a generative model is used as a weight on the edge that is used to score the path in block 860. Some embodiments combine the scores from both the forwards models and backwards models for the edge scores. One or more embodiments combine these scores with addition, and some embodiments combine the scores with multiplication. One or more embodiments use the forwards scores for edges that were in the front half of the insertion, and the backwards scores for the edges in the back half of the insertion. In some embodiments particle filtering techniques are used to maintain only a subset of the nodes and edges that were going to be selected in block 860. In block 860 process 800 scores paths with forwards and backwards scores from the models and selects the top X best scoring paths. The associated words are returned for the insertions. In some embodiments dynamic programming is used to select the best paths. In one or more embodiments particle filtering techniques are used to determine the best paths.

Figure 9:
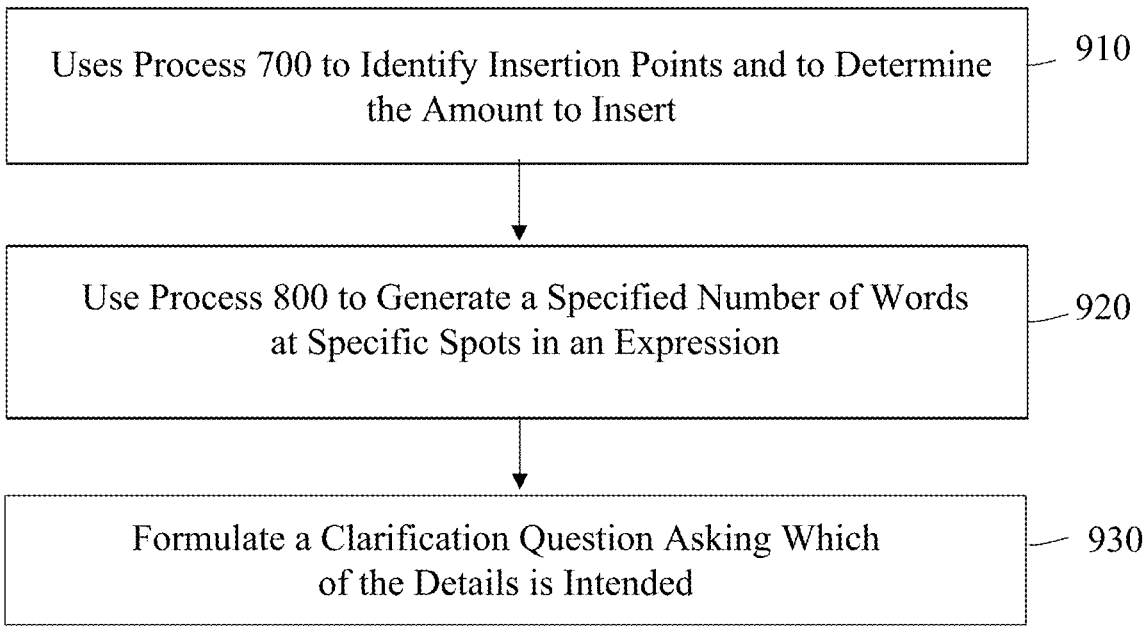
FIG. 9 shows a block diagram of a process for generating clarifying follow up questions, according to some embodiments.

FIG. 9 shows a block diagram of a process 900 for generating clarifying follow up questions, according to some embodiments. In block 910 process 900 uses process 700 (FIG. 7) to identify insertion points and to determine the amount to insert. In block 920 process 900 uses process 800 (FIG. 8) to generate a specified number of words at specific spots in an expression. These are the details that need clarification. In block 930 process 900 formulates a clarification question asking which of the details is intended. In some embodiments a general template may be used where the additional details are slotted into a general question such as, "Did you mean X, Y, or Z?" In one or more embodiments the text surrounding the insertion point in the template is to provide context. A fixed number of words around the insertion point may be chosen, the entire sentence (plus insertion) may be selected, or subsections of the sentence may be selected with rules based upon the output of a parser. In some embodiments subsections of the sentence are used. The end of the subsection is either the end of the sentence or the first encountered closed class word (non-inclusive) from the insertion point. The start of the sub-section is the last encountered closed class word from the insertion point (inclusive).

Figure 10:
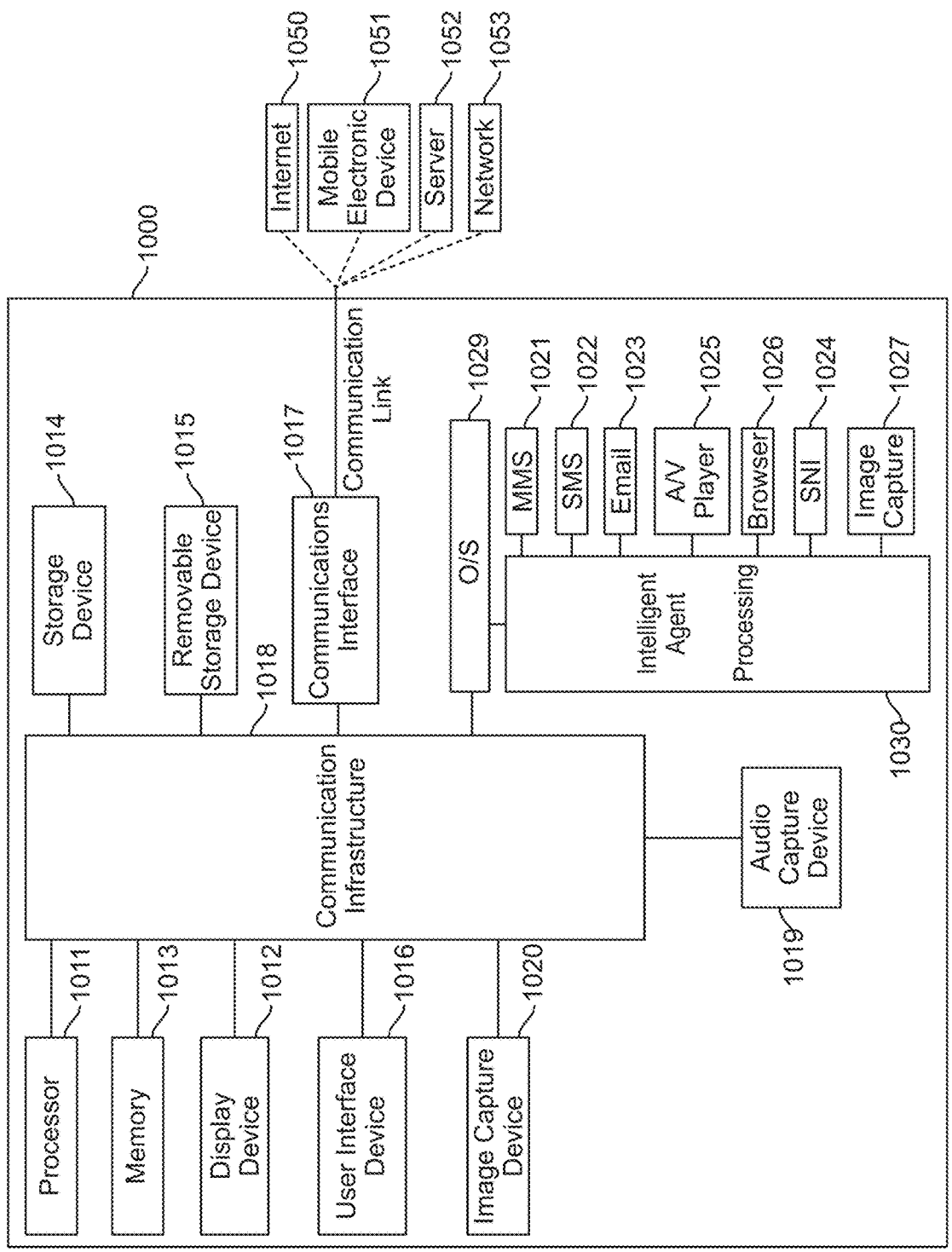
FIG. 10 is a high-level block diagram showing an information processing system comprising a computing system implementing one or more embodiments.

FIG. 10 is a high-level block diagram showing an information processing system comprising a computing system implementing one or more embodiments. The system 1000 includes one or more processors 1011 (e.g., ASIC, CPU, etc.), and may further include an electronic display device 1012 (for displaying graphics, text, and other data), a main memory 1013 (e.g., random access memory (RAM), cache devices, etc.), storage device 1014 (e.g., hard disk drive), removable storage device 1015 (e.g., removable storage drive, removable memory, a magnetic tape drive, optical disk drive, computer-readable medium having stored therein computer software and/or data), user interface device 1016 (e.g., keyboard, touch screen, keypad, pointing device), and a communication interface 1017 (e.g., modem, wireless transceiver (such as Wi-Fi, Cellular), a network interface (such as an Ethernet card), a communications port, or a PCMCIA slot and card).

The communication interface 1017 allows software and data to be transferred between the computer system and external devices through the Internet 1050, mobile electronic device 1051, a server 1052, a network 1053, etc. The system 1000 further includes a communications infrastructure 1018 (e.g., a communications bus, cross bar, or network) to which the aforementioned devices 1011 through 1017 are connected.

The information transferred via communications interface 1017 may be in the form of signals such as electronic, electromagnetic, optical, or other signals capable of being received by communications interface 1017, via a communication link that carries signals and may be implemented using wire or cable, fiber optics, a phone line, a cellular phone link, a radio frequency (RF) link, and/or other communication channels.

In one implementation of one or more embodiments in a mobile wireless device (e.g., a mobile phone, tablet, wearable device, etc.), the system 1000 further includes an image capture device 1020, such as a camera 128 (FIG. 2), and an audio capture device 1019, such as a microphone 122 (FIG. 2). The system 1000 may further include application processing or processors as MMS 1021, SMS 1022, email 1023, social network interface (SNI) 1024, audio/video (AV) player 1025, web browser 1026, image capture 1027, etc.

In one embodiment, the system 1000 includes intelligent agent processing 1030 that may implement processing similar as described regarding intelligent assistant app 129 (FIG. 2), processing for process 600 (FIG. 6), process 700 (FIG. 7), process 800 (FIG. 8) and process 900 (FIG. 9) as described above. In one embodiment, the intelligent agent processing 1030 along with an operating system 1029 may be implemented as executable code residing in a memory of the system 1000. In another embodiment, the intelligent agent processing 1030 may be provided in hardware, firmware, etc.

In one embodiment, the main memory 1003, storage device 1004 and removable storage device 1005, each by themselves or in any combination, may store instructions for the embodiments described above that may be executed by the one or more processors 1001.

As is known to those skilled in the art, the aforementioned example architectures described above, according to said architectures, can be implemented in many ways, such as program instructions for execution by a processor, as software modules, microcode, as computer program product on computer readable media, as analog/logic circuits, as application specific integrated circuits, as firmware, as consumer electronic devices, AV devices, wireless/wired transmitters, wireless/wired receivers, networks, multi-media devices, etc. Further, embodiments of said Architecture can take the form of an entirely hardware embodiment, an entirely software embodiment or an embodiment containing both hardware and software elements.

One or more embodiments have been described with reference to flowchart illustrations and/or block diagrams of methods, apparatus (systems) and computer program products according to one or more embodiments. Each block of such illustrations/diagrams, or combinations thereof, can be implemented by computer program instructions. The computer program instructions when provided to a processor produce a machine, such that the instructions, which execute via the processor create means for implementing the functions/operations specified in the flowchart and/or block diagram. Each block in the flowchart/block diagrams may represent a hardware and/or software module or logic, implementing one or more embodiments. In alternative implementations, the functions noted in the blocks may occur out of the order noted in the figures, concurrently, etc.

The terms "computer program medium," "computer usable medium," "computer readable medium", and "computer program product," are used to generally refer to media such as main memory, secondary memory, removable storage drive, a hard disk installed in hard disk drive. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Computer program instructions representing the block diagram and/or flowcharts herein may be loaded onto a computer, programmable data processing apparatus, or processing devices to cause a series of operations performed thereon to produce a computer implemented process. Computer programs (i.e., computer control logic) are stored in main memory and/or secondary memory. Computer programs may also be received via a communications interface. Such computer programs, when executed, enable the computer system to perform the features of the embodiments as discussed herein. In particular, the computer programs, when executed, enable the processor and/or multi-core processor to perform the features of the computer system. Such computer programs represent controllers of the computer system. A computer program product comprises a tangible storage medium readable by a computer system and storing instructions for execution by the computer system for performing a method of one or more embodiments.

Though the embodiments have been described with reference to certain versions thereof; however, other versions are possible. Therefore, the spirit and scope of the appended claims should not be limited to the description of the preferred versions contained herein.

What is claimed is:

1. A method for intelligent assistance, comprising:
   identifying one or more insertion points within a natural language input comprising text for providing additional information;
   training a backwards language model to predict a previous word given following words in the natural language input;
   representing a text expression from the natural language input as a graph;
   creating nodes in the graph that represent the additional information;
   using the trained backwards language model for: inserting the nodes within the graph, generating and scoring edge weights linking the nodes to the graph, determining node paths within the graph, and determining backwards scores for edges in a back half of the inserted nodes; and generating a follow-up expression based on the backwards scores and the prediction from the trained backwards language model, the follow-up expression including at least a portion of the natural language input and the additional information at the one or more insertion points for clarifying or supplementing meaning of the natural language input.

2. The method of claim 1, wherein identifying the one or more insertion points within the natural language input is based on a natural language model, and the backwards language model comprises a neural network.

3. The method of claim 2, wherein the additional information is determined to be consistent with intent of the natural language input.

4. The method of claim 3, further comprising:
selecting a set of words from the natural language input while maintaining sequential order of the words present in the natural language input.

5. The method of claim 4, further comprising:
partitioning the set of words into a first subset and a second subset.

6. The method of claim 5, further comprising:
determining a word distance between the first subset and the second subset based on the natural language model; and
determining the one or more insertion points based on the word distance.

7. The method of claim 6, further comprising:
for each insertion point, identifying words to be inserted for forming the additional information, using both a trained forward language model and the trained backwards language model, wherein the trained forward language model predicts probability of a next word given prior words in the natural language input, the trained backwards language model predicts probability of the previous word given following words in the natural language input; and
using the trained forward language model for: inserting the nodes within the graph, generating and scoring of the edge weights, determining of the node paths within the graph, and determining forwards scores for edges in a front half of the inserted nodes, wherein the node paths are further scored with the forwards scores, and generating the follow-up expression is based on the backwards scores, the forward scores, and the prediction from both the trained backwards language model and the trained forward language model.

8. An electronic device comprising:
a memory storing instructions; and
at least one processor executing the instructions including a process configured to:
identify one or more insertion points within a natural language input comprising text for providing additional information;
train a backwards language model to predict a previous word given following words in the natural language input;
represent a text expression from the natural language input as a graph;
create nodes in the graph that represent the additional information;
use the trained backwards language model to: insert the nodes within the graph, generate and score edge weights linking the nodes to the graph, determine node paths within the graph, and determine backwards scores for edges in a back half of the inserted nodes; and
generate a follow-up expression based on the backwards scores and the prediction from the trained backwards language model, the follow-up expression including at least a portion of the natural language input and the additional information at the one or more insertion points for clarifying or supplementing meaning of the natural language input.

9. The electronic device of claim 8, wherein a natural language model is used to identify the one or more insertion points within the natural language input, the backwards language model comprises a neural network.

10. The electronic device of claim 9, wherein the additional information is determined to be consistent with intent of the natural language input.

11. The electronic device of claim 10, wherein the process further comprises:
selection of a set of words from the natural language input while maintaining sequential order of the words present in the natural language input.

12. The electronic device of claim 11, wherein the process further comprises:
partitioning the set of words into a first subset and a second subset;
determining a word distance between the first subset and the second subset based on the natural language model; and
determining the one or more insertion points based on the word distance.

13. The electronic device of claim 10, wherein the process is further configured to:
for each insertion point, identify words to be inserted to form the additional information, using both a trained forward language model and the trained backwards language model, wherein the trained forward language model predicts probability of a next word given prior words in the natural language input, and the trained backwards language model predicts probability of the previous word given following words in the natural language input; and
use the trained forward language model to: insert the nodes within the graph, generate and score the edge weights, determine the node paths within the graph, and determine forwards scores for edges in a front half of the inserted nodes, wherein the node paths are further scored with the forwards scores, and generation of the follow-up expression is based on the backwards scores, the forward scores, and the prediction from both the trained backwards language model and the trained forward language model.

14. The electronic device of claim 8, wherein the process is performed on at least one of a server device, a smart portable device, a smart appliance, or a combination thereof.

15. A non-transitory processor-readable medium that includes a program that when executed by a processor perform a method comprising:
identifying one or more insertion points within a natural language input comprising text for providing additional information;
training a backwards language model to predict a previous word given following words in the natural language input;
representing a text expression from the natural language input as a graph;

creating nodes in the graph that represent the additional information;

using the trained backwards language model for: inserting the nodes within the graph, generating and scoring edge weights linking the nodes to the graph, determining node paths within the graph, and determining backwards scores for edges in a back half of the inserted nodes; and generating a follow-up expression based on the backwards scores and the prediction from the trained backwards language model, the follow-up expression including at least a portion of the natural language input and the additional information at the one or more insertion points for clarifying or supplementing meaning of the natural language input.

16. The non-transitory processor-readable medium of claim 15, wherein identifying the one or more insertion points within the natural language input is based on a natural language model, and the backwards language model comprises a neural network.

17. The non-transitory processor-readable medium of claim 16, wherein the additional information is determined to be consistent with intent of the natural language input.

18. The non-transitory processor-readable medium of claim 17, wherein the method further comprises:
    selecting a set of words from the natural language input while maintaining sequential order of the words present in the natural language input; and
    partitioning the set of words into a first subset and a second subset.

19. The non-transitory processor-readable medium of claim 18, wherein the method further comprises:
    determining a word distance between the first subset and the second subset based on the natural language model; and
    determining the one or more insertion points based on the word distance.

20. The non-transitory processor-readable medium of claim 19, wherein the method further comprises:
    for each insertion point, identifying words to be inserted for forming the additional information, using both a trained forward language model and the trained backwards language model, wherein the trained forward language model predicts probability of a next word given prior words in the natural language input, and the trained backwards language model predicts probability of the previous word given following words in the natural language input; and
    using the trained forward language model for: inserting the nodes within the graph, generating and scoring of the edge weights, determining of the node paths within the graph, and determining forwards scores for edges in a front half of the inserted nodes, wherein the node paths are further scored with the forwards scores, and generating the follow-up expression is based on the backwards scores, the forward scores, and the prediction from both the trained backwards language model and the trained forward language model.

* * * * *